United States Patent [19]

Osanai

[11] 4,346,414
[45] Aug. 24, 1982

[54] TAPE RECORDER

[75] Inventor: Akira Osanai, Hachioji, Japan

[73] Assignee: Olympus Optical Co., Ltd., Tokyo, Japan

[21] Appl. No.: 145,733

[22] Filed: May 1, 1980

Related U.S. Application Data

[62] Division of Ser. No. 90,900, Nov. 5, 1979, Pat. No. 4,309,727.

[30] Foreign Application Priority Data

| Nov. 16, 1978 | [JP] | Japan | 53-141616 |
| Nov. 16, 1978 | [JP] | Japan | 53-141618 |
| Nov. 16, 1978 | [JP] | Japan | 53-157809[U] |

[51] Int. Cl.³ .............. G11B 15/32; G11B 15/44; G11B 15/26
[52] U.S. Cl. .................. 360/90; 242/200; 242/201; 360/74.2
[58] Field of Search ............... 360/90, 93, 96.1, 96.3, 360/96.4, 74.1, 74.2; 242/200-201, 208-210, 191

[56] References Cited

U.S. PATENT DOCUMENTS

| 3,459,390 | 8/1969 | Hugel | 242/200 |
| 3,718,777 | 2/1973 | Tupaj et al. | 360/90 |
| 4,059,245 | 11/1977 | Hirose | 242/201 |
| 4,106,725 | 8/1978 | Richt | 360/74.2 |
| 4,131,922 | 12/1978 | Yoshida et al. | 360/90 |

FOREIGN PATENT DOCUMENTS 50-10606 5/1975 Japan.

Primary Examiner—Alfred H. Eddleman

[57] ABSTRACT

A tape recorder comprises a reel mechanism provided with a pair of one-way clutches effectively acting in the opposite directions. The motive power-transmitting mechanism of the tape recorder comprises a capstan gear mounted on a flywheel-bearing center capstan shaft disposed in an area defined by a pair of reel shafts of the reel mechanism and other related member and a pair of reel gears each of which is rotatably fitted to the reel shaft and transmits the rotation moment of a motor to the reel shaft by means of either of the paired one-way clutches. The motive power-transmitting mechanism further comprises an intermediate gear simultaneously engageable with the capstan gear and the paired reel gears. Therefore, the rotation moment of the motor transmitted to the flywheel is conducted from the capstan gear to the intermediate gear and then to the paired reel gears at the same time. The rotation moment of the motor is delivered to only the desired reel shaft by means of the corresponding reel gear.

3 Claims, 4 Drawing Figures

TAPE RECORDER

This application is a division of application Ser. No. 090,900, filed Nov. 5, 1979, now U.S. Pat. No. 4,309,727.

BACKGROUND OF THE INVENTION

This invention relates to a tape recorder, and more particularly to a tape recorder whose reel mechanism is fitted with a pair of one-way clutches. With the conventional tape recorder, a tape rewind is carried out by actuating an idler changeover mechanism, reversing the drive of a motor, and letting a supply reel act as a takeup reel. However, the prior art tape recorder in which the idler operation is changed over for a tape rewind has the drawback that an idler changeover mechanism has to be provided, undesirably enlarging and complicating the arrangement. The Japanese Patent Disclosure No. 10606/75 disclosed a tape recorder whose reel mechanism was fitted with a pair of one-way clutches to eliminate the above-mentioned idler changeover mechanism. This proposed tape recorder was of the dual capstan system and comprised a first endless belt stretched over a motor pulley and a pair of flywheels, and a second endless belt stretched over the motor pulley and a pair of reels each fitted with a oneway clutch. The belts were made to run in a prescribed direction by the normal or backward drive of a motor. The reproduction or recording mode or fast forward or rewind mode of a tape run was effected by the abovementioned process. In this case, however, the endless belt was required to have a certain thickness, presenting difficulties in reducing the thickness of the reel mechanism. The prior art had further drawbacks that the endless belt indicated unsatisfactory temperature characteristic and was ready to be broken, extended or contacted, making it difficult to ensure a stable tape run. Provision of two endless belts and two capstan shafts unavoidably increased the number of parts and enlarged and complicated the arrangement of a tape recorder as a whole.

SUMMARY OF THE INVENTION

It is accordingly an object of this invention to provide a tape recorder which is freed of an idler changeover mechanism by application of a pair of one-way clutches and is reduced in size and thickness.

To attain the above-mentioned object, this invention provides a tape recorder which is of the center capstan type and comprises a motive power-transmitting mechanism consisting of a series of gears and reel mechanism fitted with a pair of one-way clutches.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Description is given of a tape recorder embodying this invention with reference to the accompanying drawing.

Figure 1:
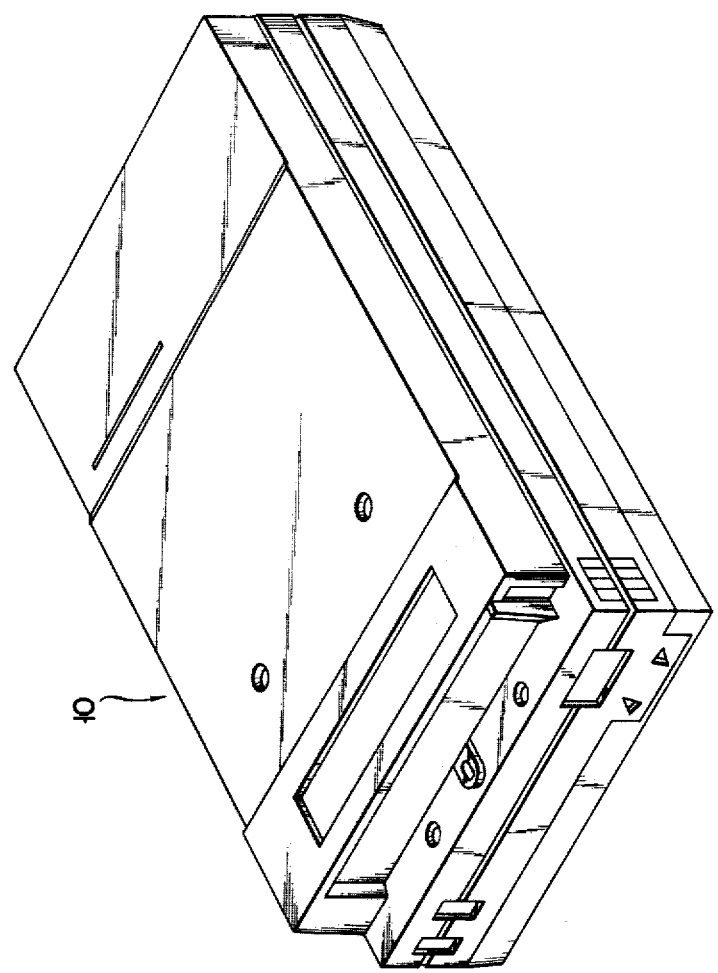
FIG. 1 is a schematic perspective view of a tape recorder embodying this invention.

A tape recorder 10 of FIG. 1 embodying this invention represents the Staar system in which a movable chassis is lifted simply by inserting a cassette into a tape recorder at an opening 11. Obviously, this invention is not limited to the construction of the Starr system.

Figure 2:
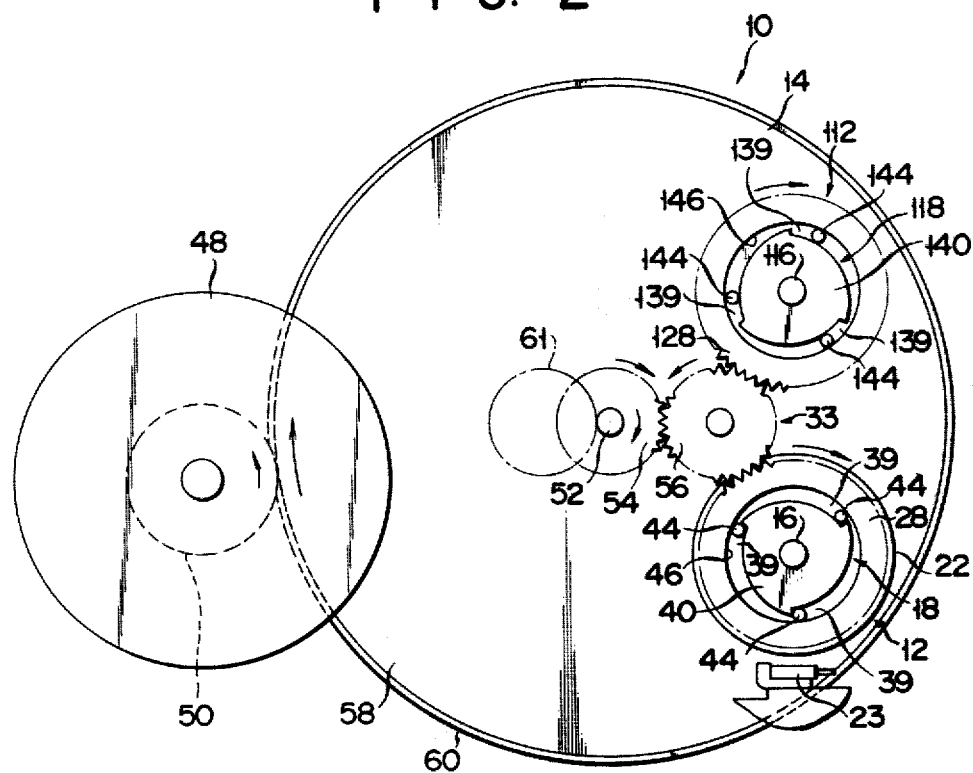
FIG. 2 is a schematic top plan view showing the relationship of the motive power-transmitting mechanism and reel mechanism of the tape recorder of FIG. 1.
Figure 4:
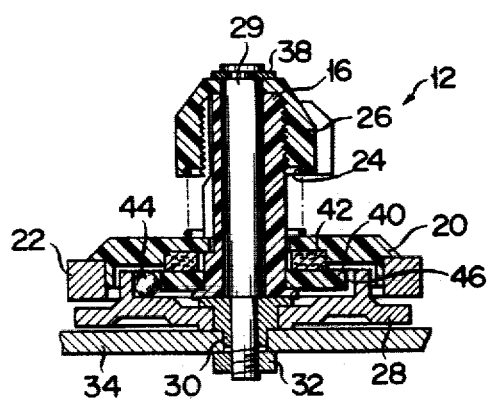
FIG. 4 is a longitudinal sectional view of the reel shown in FIG. 3.
Figure 3:
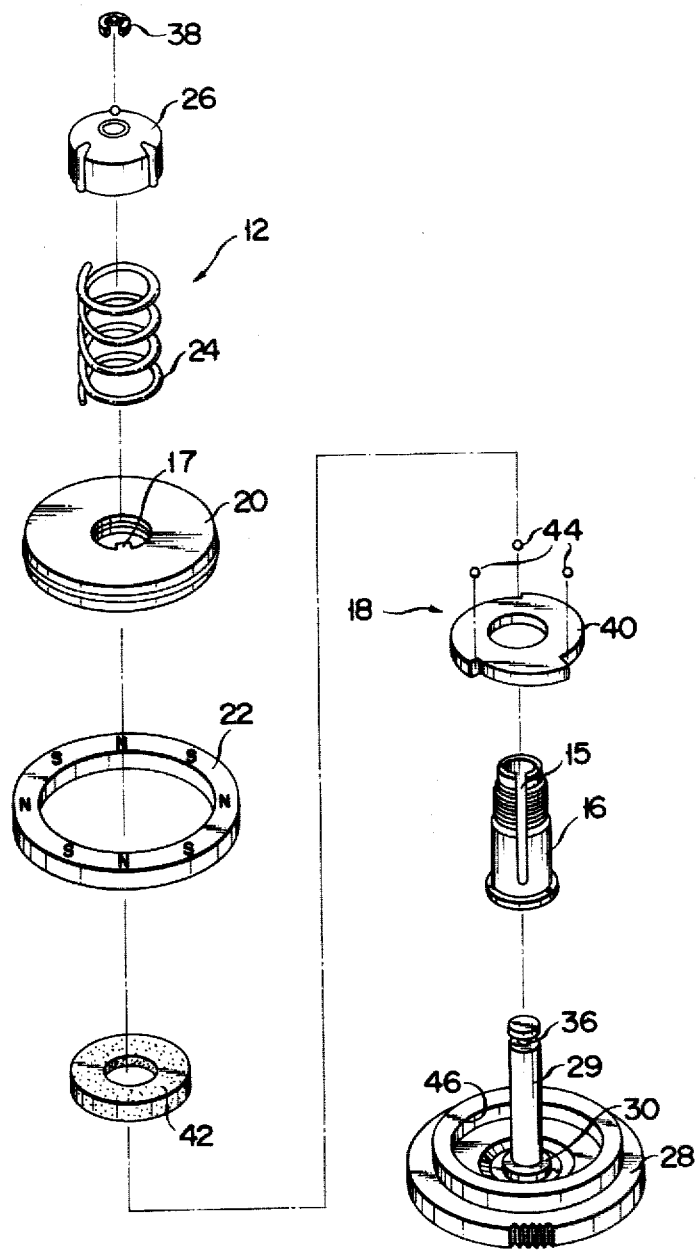
FIG. 3 is an exploded perspective view of one of the reels constituting the reel mechanism.

As shown in FIG. 2, the tape recorder comprises a reel mechanism 14 formed of a pair of reels 12, 112. Obviously, these reels 12, 112 respectively act as a supply reel or takeup reel in accordance with the direction in which the motor is driven. Description is now given of the construction of the reel 12 which acts as a supply reel at the forward run of a magnetic tape. As seen from FIGS. 3 and 4, the reel 12 comprises a flanged hollow reel shaft 16 whose upper portion is threaded and provided with an axially extending slit 15, and a reel rest 20 which has a key 17 engageable the slit 15 of the hollow reel shaft 16 and is fitted to the hollow reel shaft 16 by means of a one-way clutch 18. The periphery of the reel rest 20 is fitted with a pulse-generating magnetic ring 22, on the surface of which the N and S poles are alternately arranged in the circumferential direction. A magnetism-sensitive element 23 (FIG. 2) capable of sensing variations in the magnetic force of the magnetic ring 22 is disposed closely adjacent to the magnetic ring 22. A drive pawl 26 is threadedly engaged with the external thread section of the hollow reel shaft 16 by means of a compression coil spring 24. The hollow reel shaft 16 is loosely fitted around the periphery of a gear shaft 29 of a reel gear 28 constituting part of the later described motive power-transmitting mechanism 33. The reel gear 28 is fixed to the gear shaft 29 by means of a collar 30. A nut 32 is threadedly engaged with the external thread section of the lower end portion of the gear shaft 29, thereby fixing the reel 12 to a chassis 34. A snap ring 38 is fitted to an annular groove 36 formed at the free end of the gear shaft 29.

A one-way clutch 18 comprises a clutch plate 40, on the periphery of which three vortically shaped notches 39 are equiangularly arranged in the circumferential direction, a felt plate 42 disposed between the clutch plate 40 and reel rest 20, and three steel balls 44 respectively received in the three vortically shaped notches 39. The steel balls 44 have such a size that they can loosely slide through a space defined between the inner peripheral wall 46 of the reel gear 28 and the three vortically shaped notches 39 of the clutch plate 40.

The takeup reel 112 has substantially the same construction as the previously described reel 12, except that the three vortically shaped notches 139 of the clutch plate 40 have a shape reversed from those of the reel 12, and that a magnet ring 22 is omitted. The component parts of the reel 112 are designated by reference numerals formed by adding a number of 100 to those of the corresponding component parts of the reel 12.

The rotation moment of the motor 48 is transmitted from a motor pulley 50 to a capstan shaft 52 and reel shafts 16, 116 by means of a motive power-transmitting mechanism 33 formed of a series of gear, instead of being conducted through, for example, an idler lever, as is the case with the conventional tape recorder. As shown in FIG. 2, the motive power-transmitting mechanism 33 comprises a capstan gear 54 fitted to a capstan shaft 52, a pair of reel gears 28, 128 respectively fitted to the reel shafts 16, 116 and intermediate gear 56. The capstan shaft 52 is disposed in an area defined by a pair of reels and other relative member such as the intermediate gear 56. Hereinafter it is referred to "a center capstan shaft". A flywheel 58 fixed to the center capstan shaft 52 is frictionally engaged with the motor pulley 50. The rotation moment of the motor 48 is transmitted from the motor pulley 50 to the center capstan shaft 52 by means of the flywheel 58, and further to the reel gears 28, 128 by means of the capstan gear 54 and intermediate gear 56. The rim of the flywheel 58 is provided with a rubber tire 60, thereby ensuring frictional engagement between the flywheel 58 and motor pulley 50. Reference numeral 61 denotes a pinch roller.

Where the pulley 50 is rotated counterclockwise of FIG. 2, then the center capstan shaft 52, and reel gears 28, 128 are all rotated clockwise. Where the reel gear 28 of the supply reel 12 is rotated clockwise, then the steel balls 44 slide toward a larger space along the inner peripheral wall 46 of the reel gear 28 and idly roll in a space defined between the inner peripheral wall 46 and clutch plate 40, giving rise to no friction therebetween. As a result, the clutch plate 40 is not rotated, nor are the reel rest 20, reel shaft 16, and drive pawl 26.

In contrast, with the reel 112, the steel balls 144 slide toward a small space along the inner peripheral wall 146 of the reel gear 128 and take a wedging action. As a result, friction arises between the inner peripheral wall 146 of the reel gear 128 and clutch plate 140, causing the clutch plate 140 to be rotated clockwise. The rotation of the clutch plate 140 leads to the rotation of the reel rest 120 by means of the felt plate 142. Accordingly, the reel 112 takes up a magnetic tape.

Where the motor pulley 50 is rotated clockwise (not shown), then the clutch plate 40 and reel rest 20 are rotated by an operation reversed from that described above, thereby causing a magnetic tape to be taken up. The motive power-transmitting mechanism 33 comprising the flywheel 58, capstan gear 54, intermediate gear 56 and reel gears 28, 128 simultaneously rotates the reel gears 28, 128 corresponding to the reels 12, 112. Only that of the reels which acts to take up a magnetic tape is rotated by the one-way clutch 18 or 118. The backward drive of the motor 48 easily effected the rewind of a magnetic tape. In the above-mentioned embodiment, a pulse-generating magnetic ring 22 is fitted to the periphery of the reel rest 20. However, the motor pulley 50 itself can be made to act as a magnetic ring. This arrangement reduces the number of the component parts of a tape recorder, and facilitates its assembly. In this case, the magnetism-sensitive element 23 is obviously set adjacent to the motor pulley 50.

As described above, the motive power-transmitting mechanism of a tape recorder embodying this invention comprises a flywheel and capstan gear fitted to a center capstan shaft, and a pair of reel gears rotatably fitted to the reel shaft of a reel mechanism, which is a reel mechanism fitted with a pair of one-way clutches effectively driven in the opposite directions, to transmit the rotation moment of the motor to said reel shaft by means of either of said paired one-way clutches. The motive power-transmitting mechanism further comprises an intermediate gear simultaneously engageable with the capstan gear and paired reel gears.

With the tape recorder of this invention, application of the paired one-way clutches makes it possible to omit an idler changeover mechanism. A capstan shaft is set at the center of the paired reel shafts. A belt is replaced by an assembly of extremely thin gears, raising no problem in respect to the temperature characteristic of the tape recorder. Further advantages of the present invention are that the tape recorder can be formed of a fewer parts and reduced in size and thickness than has been possible in the past.

What is claimed is:

1. A tape recorder embodying a reel mechanism fitted with a pair of one-way clutches and comprising:
   a reversible motor;
   a center capstan shaft having a flywheel fixed thereto;
   a capstan gear fitted to said center capstan shaft;
   a pair of spaced reel shafts disposed in a common vertical plane and having reel gears mounted thereon;
   an intermediate gear interposed between and engaging said reel gears and said capstan gear with the center of said intermediate gear and the center of said capstan shaft lying in a common vertical plane normal to the vertical plane of said reel shafts; and
   a pulley coupled to said motor and engaging said flywheel for transmitting the rotation moment of the motor to one of said reel shafts by one of said pair of one-way clutches.

2. The tape recorder according to claim 1, wherein the flywheel is frictionally engaged with a motor pulley.

3. The tape recorder according to claim 2, wherein the rim of the flywheel is fitted with a rubber tire, and the flywheel is frictionally engaged with the motor pulley by means of the rubber tire.

* * * * *